United States Patent
Wick et al.

[11] 3,955,208
[45] May 4, 1976

[54] PHOTOGRAPHIC CAMERA WITH LIQUID-CRYSTAL DIAPHRAGM ARRANGEMENT

[75] Inventors: Richard Wick, Munich; Eduard Wagensonner, Aschheim; Karl Wagner, Ottobrunn, all of Germany

[73] Assignee: AGFA-Gevaert AG, Leverkusen, Germany

[22] Filed: June 6, 1974

[21] Appl. No.: 477,087

[30] Foreign Application Priority Data
June 7, 1973 Germany.............. 2329014

[52] U.S. Cl............................ 354/227; 350/160 LC
[51] Int. Cl.² ...................... G03B 7/08; G03B 9/56
[58] Field of Search ............... 354/227; 350/160 LC

[56] References Cited
UNITED STATES PATENTS
3,476,029  11/1969  Schreckendgust................... 354/227

*Primary Examiner*—L. T. Hix
*Assistant Examiner*—Russell E. Adams, Jr.
*Attorney, Agent, or Firm*—Michael J. Striker

[57] ABSTRACT

A photographic camera includes a diaphragm arrangement comprised of at least one body of liquid crystal positioned in the path of light entering the camera. The size of the opening of the diaphragm arrangement is changed by changing the transparency of at least one portion of the one or more bodies of liquid crystal.

10 Claims, 6 Drawing Figures

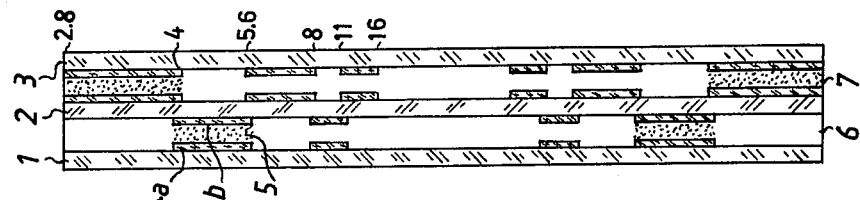
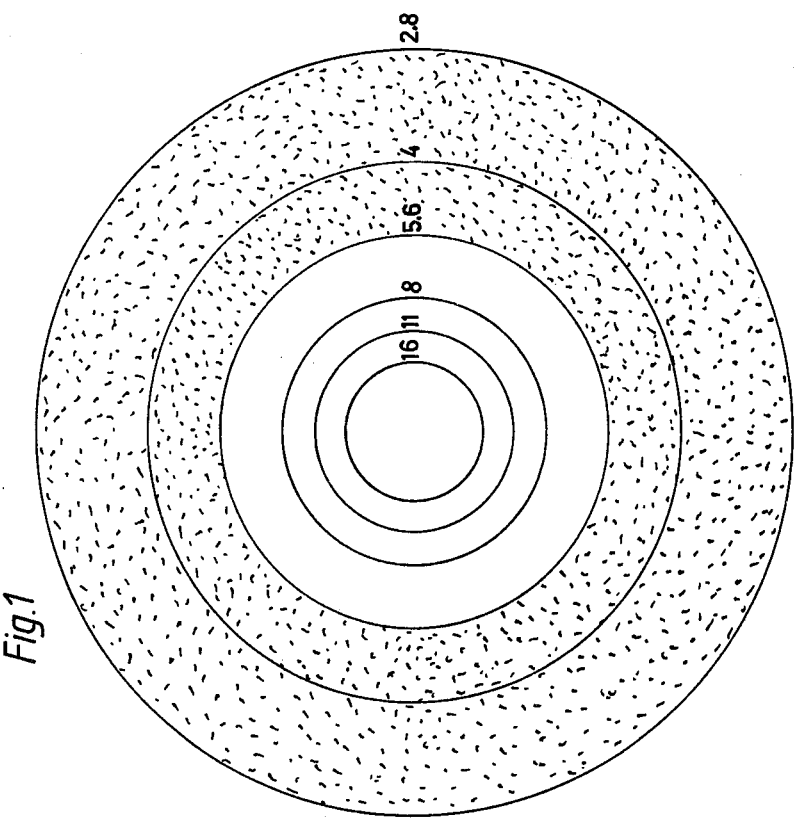

PHOTOGRAPHIC CAMERA WITH LIQUID-CRYSTAL DIAPHRAGM ARRANGEMENT

BACKGROUND OF THE INVENTION

The invention relates to a photographic camera having a diaphragm arrangement which can be set to at least two different aperture sizes.

Numerous diaphragm constructions for photographic cameras are known. However, all the known constructions involve the use of moving mechanical parts and accordingly are subject to wear, to a greater or lesser degree.

SUMMARY OF THE INVENTION

It is a general object of the invention to provide a diaphragm construction, having at least two different selectable aperture sizes, which makes use of no moving parts.

This object, and others which will become more understandable from the description, below, of preferred embodiments, can be met, according to one advantageous concept of the invention, by providing, in a photographic camera, a diaphragm arrangement comprising one or more bodies of liquid crystal positioned in the path of light entering the camera, and means for changing the size of the opening of the diaphragm arrangement by changing the transparency of at least one portion of the one or more bodies of liquid crystal.

For a stepwise changing of the aperture size of the diaphragm arrangement, it is advantageous to provide two liquid-crystal elements provided with staggered controllable zones, i.e., so that when a particular zone is rendered opaque, the adjoining zone is located on the other of the two liquid-crystal bodies, so as to avoid any problem in the control of neighboring controllable zones, and in particular to avoid the existence of non-controllable portions of the liquid-crystal material intermediate adjoining zones.

According to a second advantageous embodiment of the invention, the diaphragm arrangement is comprised of a liquid-crystal element provided with an electrically conductive outer ring connector, the diameter of which corresponds to the maximum aperture diameter, and an electrically conductive inner ring connector the diameter of which corresponds to the minimum diaphragm aperture size, and finally a transparent electrode connecting together the inner and outer ring connectors and possessed of substantial surface resistance.

To control the transparency of the zones of the first embodiment, there is provided a light-dependent voltage divider having a plurality of taps, each tap connected to the input of a respective voltage threshold detector, such as a Schmitt trigger. The output of each voltage threshold detector is connected to and controls one of the zones of the liquid-crystal diaphragm arrangement.

To control the transparency of the zones of the second embodiment, use is made of a known bridge circuit including in one of its branches a photoresistor, connected to a difference amplifier. As the output voltage of the difference amplifier increases, the transparency of the diaphragm arrangement decreases in radially inwards direction.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 4A:
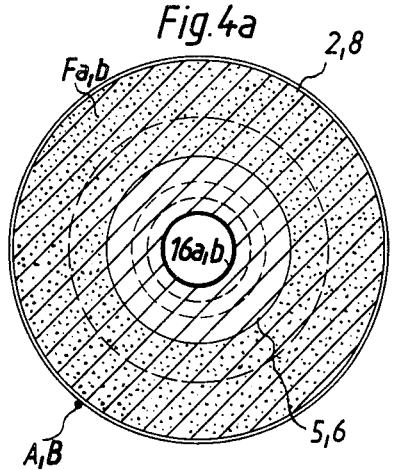

FIG. 1 depicts one exemplary liquid-crystal diaphragm arrangement as seen from the front, whereas FIG. 2 depicts the same liquid-crystal diaphragm arrangement in a sectional view.

The liquid-crystal diaphragm arrangement of FIGS. 1 and 2 is comprised of three parallel spaced transparent plates 1, 2, 3, together defining two parallel adjoining chambers 6 and 7.

Inside the chamber 6, on the facing surfaces of the transparent plates 1 and 2, there are provided a pair of transparent electrodes 4a, 4b. The transparent electrodes 4a, 4b are ring-shaped, have the same inner and outer diameters and are concentric. Also inside the chamber 6 is another pair of such transparent electrodes, having an outer diameter smaller than the inner diameter of electrodes 4a, 4b. Inside the chamber 7, there are provided three further pairs of such transparent electrodes. Non-illustrated electrical leads are connected to the various transparent electrodes, so that a potential difference can be established across the two transparent electrodes of each pair of electrodes.

The inner and outer diameters of the five pairs of coaxial transparent electrodes are such that the surface area of each of the electrode pairs is twice the surface area of the next-smaller electrode pair. This progression of diameters and surface areas corresponds to the conventional progression of F/numbers, namely 2.8, 4, 5.6, 8, 11, 16.

The electrodes in the two chambers 6 and 7 are so distributed that the electrode pairs associated with neighboring annular zones are located in different ones of the two chambers 6 and 7. The breadth of each of the electrode rings is so dimensioned that neighboring pairs of electrodes form an overlap to such an extent that, if both of the neighboring annular zones are in the nontransparent state no light will be able to pass through between the neighboring annular zones.

The chambers 6, 7 are filled with liquid crystal. When a potential difference is established between the two electrodes of one of the five electrode pairs, the transparency of the portion of the liquid crystal material between the two electrodes of the electrode pair changes, e.g., the portion of the liquid crystal material between the two electrodes becomes almost completely non-light-transmissive. This effect is known and may be effected by liquid crystals, which change the phase of transmitting light by influence of an electric field. Darkening or lighting of zones is effected by changing phase between crossed or parallel polarizing filters 1, 2, 3.

Figure 3:
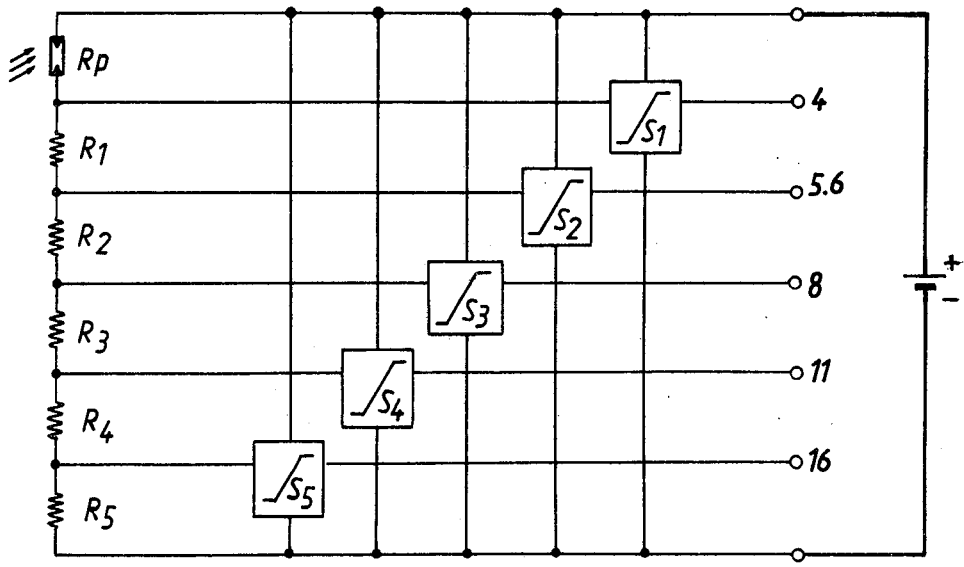

To control the liquid-crystal diaphragm arrangement, there is provided an electronic control circuit, which is depicted in FIG. 3.

The circuit of FIG. 3 is comprised of a photoresistor Rp connected in series with five resistors R1, R2, R3, R4, R5, to form together a light-dependent voltage divider connected across the camera battery, the stages of the voltage divider corresponding to the F/numbers 2.8 to 16. Five voltage threshold detectors (e.g., Schmitt triggers) S1, S2, S3, S4, S5 are provided. Each of the threshold detectors S1–S5 is connected across the battery and has an input connected to a respective tap of the light-dependent voltage divider, and also has a respective output, designated 4, 5.6, 8, 11, 16. Each of the threshold detectors responds to the same level of input voltage. For example, if each of the threshold detectors S1 to S5 is a Schmitt trigger, the output signal of the Schmitt trigger will be zero volts when the voltage applied across the Schmitt trigger input is below the predetermined threshold value, and will equal approximately the battery voltage when the voltage applied across the Schmitt trigger input is above the predetermined threshold value, the predetermined threshold value being the same for all five Schmitt triggers. If the intensity of light incident upon photoresistor Rp is lower than the light value associated with F/number 4, then the resistance of Rp will be so high that the total voltage drop across the resistors R1, R2, R3, R4, R5 will be less than the predetermined voltage to which the Schmitt triggers S1 to S5 respond. Accordingly, the voltage across the input of S1 will be below such predetermined voltage, and the output voltage of S1 will be zero. The voltage across the inputs of S2, S3, S4, and S5 will of course be even lower, and accordingly the output voltages of S2 to S5 will likewise be zero. As a result, non-zero voltage will be applied to none of the transparent annular electrodes, all the annular liquid-crystal zones will be light-transmissive, and the liquid-crystal diaphragm arrangement will have the largest possible opening, corresponding to F/number 2.8. It will be understood that one electrode of each transparent electrode pair is connected to the negative battery terminal, whereas the other electrode of each transparent electrode pair is connected to the output of a respective one of the five threshold detectors S1 to S5. Specifically, the output of threshold detector S1 is connected to one of the electrodes of the largest-diameter electrode pair. The output of threshold detector S2 is connected to one of the electrodes of the second largest electrode pair, etc., the output of threshold detector S5 being connected to one of the electrodes of the smallest-diameter electrode pair.

If now the intensity of scene light incident upon the photoresistor R*p* (mounted on the camera for exposure to scene light) increases, the resistance of Rp will decrease, and accordingly, the voltages at the inputs of S1 to S5 will all rise, the voltage at the input of S1 being the greatest. If the voltage at the input of S1 reaches the predetermined value, the voltage at the output of S1 will change from zero to approximately the full battery voltage. As a result, a potential difference will be established across the two electrodes of the radially outermost electrode pair, in consequence of which the liquid crystal material therebetween will become opaque, thereby reducing the aperture diameter to a value corresponding to F/number 4, the output voltages of the four other threshold detectors S2 to S5 all being zero.

If the intensity of scene light incident upon Rp increases further, the resistance of Rp decreases further, and the voltage across the series combination of resistors R2 to R5 will reach the predetermined value, triggering the threshold detector S2, and thereby rendering the second-largest annular liquid-crystal zone opaque, so as to reduce the diaphragm diameter to a value corresponding to F/number 5.6. The outermost annular liquid-crystal zone will of course also be opaque, since the threshold detector S1 will also be in triggered condition, because clearly the input voltage of S1 is always greater than the input voltage of S2.

Similarly, as the light intensity increases further, the diaphragm aperture diameter decreases to values corresponding to F/numbers 8, 11 and 16.

Figure 5:
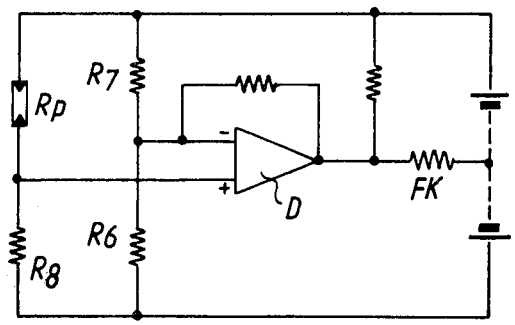
Figure 4B:
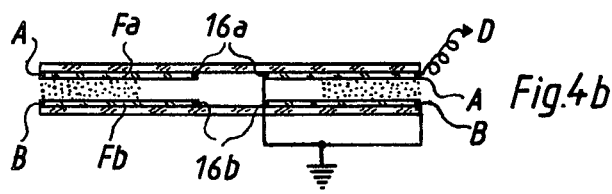

A second embodiment of the invention is depicted in FIG. 4a and FIG. 4b and an electronic control circuit therefor is depicted in FIG. 5.

The liquid-crystal diaphragm arrangement is similar to that shown in FIG. 1 but is comprised of only a single chamber defined between two spaced, parallel transparent plates. A single transparent electrode pair $F_a$, $F_b$ is provided, the electrodes of which are annular and have an outer diameter corresponding to the diameter of the largest diaphragm opening (F/number 2.8) and having an inner diameter corresponding to the smallest diaphragm opening (F/number 16). One electrode $F_a$ of the annular electrode pair just mentioned has a surface or resistance, so as to form in effect a voltage divider, making unnecessary the use of the discrete voltage divider and plurality of Schmitt triggers shown in FIG. 3. To maintain the symmetry of the arrangement two annular electrodes are retained by radially outer and radially inner electrically conductive ring electrode members A, B and 16a, 16b. A voltage is established across these ring electrodes. As the voltage on terminal A increases, the electric field intensity within the liquid crystal material increases, and successive portions of the diaphragm, proceeding in radially inwards direction, become opaque, the electric field intensity being greatest at the radially outermost portion of the liquid-crystal diaphragm arrangement.

The liquid-crystal diaphragm arrangement shown in FIG. 4a and FIG. 4b can be controlled by the circuit shown in FIG. 5. The circuit of FIG. 5 is comprised of a photoresistor Rp and three further resistors R6, R7, R8, together forming a bridge circuit. A difference amplifier D is connected across the output of the bridge circuit and amplifies the bridge-circuit output voltage and applies such amplified bridge-circuit output voltage to the electrodes of the liquid-crystal diaphragm arrangement. As the intensity of scene light increases, the inner diameter of the opaque annular portion of the diaphragm decreases, resulting in a smaller and smaller diaphragm opening.

FIG. 4b depicts the liquid-crystal diaphragm of FIG. 4a in a sectional view. The transparent electrode $F_a$ has surface resistance, electrode $F_b$ has a substantially zero surface resistance. The outer metal ring A is connected to transparent electrode $F_a$. The inner metal rings 16a and 16b and the outer metal ring B are connected to both transparent electrodes and also to ground or negative battery terminals in FIG. 5. The outer metal ring A is connected directly to the output of difference amplifier D in FIG. 5.

The invention is not to be considered limited to the two specific embodiments shown. For example, it would be possible to employ a greater or smaller number of concentric annular zones. Additionally, it would be possible to modify the control circuit for the liquid-crystal diaphragm arrangement to make it dependent not only upon the intensity of scene light but also upon such factors as exposure time, film sensitivity, and the like.

Like a conventional diaphragm arrangement of a photographic camera, the liquid-crystal diaphragm arrangement of the present invention can be used in conjunction with a mechanical or other type of shutter.

For example, the liquid-crystal arrangement can be permanently connected to the camera battery, so as to operate independently of the shutter. As another possibility, the liquid-crystal diaphragm arrangement can be connected to the camera battery by means of a normally-open switch which is closed by the shutter-release button when the latter is depressed and which remains closed so long as the shutter-release button remains depressed, thereby remaining connected to the battery even after the shutter closes.

It will be understood that each of the elements described above, or two or more together, may also find a useful application in other types of circuits and constructions differing from the types described above.

While the invention has been illustrated and described as embodied in a liquid-crystal diaphragm arrangement, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore such adaptations should and are intended to be comprehended within the meaning and range of equivalence of the following claims.

What is claimed as new and desired to be protected by Letters Patent is set forth in the appended claims:

1. In a photographic camera, a diaphragm arrangement comprising liquid crystal material positioned in the path of light entering the camera, and means for changing the size of the opening of the diaphragm arrangement by alternatively changing the transparency of one or both of at least two portions of the liquid crystal material, the relative positions of said portions being such that when both said portions are non-transparent and viewed in the direction of light entering the camera said portions together form and present to such light an uninterrupted non-transparent zone, and such that when both said portions are transparent and viewed in the direction of light entering the camera said portions together form and present to such light an uninterrupted transparent zone.

2. A camera as defined in claim 1, wherein said diaphragm arrangement comprises a plurality of bodies of liquid crystal material positioned in the path of light entering the camera, and wherein said means for changing comprises means for changing the size of the opening of the diaphragm arrangement by changing the transparency of at least portions of said plurality of bodies of liquid crystal material.

3. A camera as defined in claim 2, wherein adjoining ones of said portions are located on different ones of said bodies.

4. A camera as defined in claim 1, wherein said diaphragm arrangement comprises an annular body of liquid crystal material, an inner annular electrode concentric with and having a diameter corresponding to the smallest aperture size of the diaphragm arrangement, an outer annular electrode concentric with and having a diameter corresponding to the largest aperture size of the diaphragm arrangement, and a circular transparent electrode bounding one side of said annular body of liquid crystal material, and having surface resistance.

5. A camera as defined in claim 1, wherein said means for changing comprises a light dependent voltage divider having a plurality of voltage-divider taps, a plurality of voltage threshold detector circuits each having an input connected to a respective one of said taps and each having an output, and means connecting the outputs of said voltage threshold detector circuits to different respective ones of said portions and operative for changing the transparency of different respective ones of said portions in dependence upon the signal at the output of the respective voltage threshold detector circuit.

6. A camera as defined in claim 4, wherein said means for changing comprises a bridge circuit including in one of its branches a light-dependent element, a difference amplifier having an input connected across the output of said bridge circuit and having an output connected to said electrode for controlling the transparency of different ones of said portions.

7. A camera as defined in claim 1, wherein said diaphragm arrangement comprises a plurality of bodies of liquid crystal material positioned one behind the other in the path of light entering the camera, and wherein said at least two portions are located on different ones of said bodies.

8. A camera as defined in claim 7, wherein said at least two portions overlap each other.

9. In a photographic camera, a diaphragm arrangement comprising liquid crystal material positioned in the path of light entering the camera, and means for changing the size of the opening of the diaphragm arrangement by changing the transparency of at least a portion of the liquid crystal material, said means comprising two transparent electrodes positioned in the path of light entering the camera respectively in front of and in back of the liquid crystal material, one of said transparent electrodes having surface resistance, electrical circuit means operative for establishing between two spaced locations on said one of said electrodes a variable potential difference, thereby causing the potential difference between either one of said spaced locations and locations on said one of said electrodes intermediate said spaced locations to have a value dependent upon the distance from said spaced locations, and additional electrical circuit means operative for maintaining the different portions of the other transparent electrode at a potential such that a continuous change in said potential difference will result in a continuous change in the potential difference between corresponding locations on the two transparent electrodes and accordingly a continuous change in the size of the nontransparent portion of the liquid crystal material intermediate the transparent electrodes.

10. In a photographic camera, a diaphragm arrangement comprising liquid crystal material positioned in the path of light entering the camera, and means for changing the size of the opening of the diaphragm arrangement by alternatively changing the transparency of one or both of at least two portions of the liquid crystal material, the relative positions of said portions being such that when both are non-transparent light is blocked from passing between them and that when both are transparent there is between them no obstruction to the passage of light, wherein said means comprises two transparent electrodes positioned in the path of light entering the camera respectively in front of and in back of the liquid crystal material, one of said transparent electrodes having surface resistance, electrical circuit means operative for establishing between two spaced locations on said one of said electrodes a variable potential difference, thereby causing the potential difference between either one of said spaced locations and locations on said one of said electrodes intermediate said spaced locations to have a value dependent upon the distance from said spaced locations, and additional electrical circuit means operative for maintaining the different portions of the other transparent electrode at a potential such that a continuous change in said potential difference will result in a continuous change in the potential difference between corresponding locations on the two transparent electrodes and accordingly a continuous change in the size of the non-transparent portion of the liquid crystal material intermediate the transparent electrodes.

* * * * *